United States Patent

Macchiarulo et al.

Patent Number: 5,102,374
Date of Patent: Apr. 7, 1992

[54] TOOTHED BELT AND MEANS OF TRANSMISSION RELATED THERETO

[75] Inventors: Vincenzo Macchiarulo, Pescara; Tommaso Di Giacomo, Bari, both of Italy

[73] Assignee: Pirelli Trasmissioni Industriali S.p.A., Milan, Italy

[21] Appl. No.: 666,090

[22] Filed: Mar. 7, 1991

Related U.S. Application Data

[62] Division of Ser. No. 433,789, Nov. 9, 1989, Pat. No. 5,046,993.

[30] Foreign Application Priority Data

Nov. 11, 1988 [IT] Italy ................. 22584 A/88

[51] Int. Cl.$^5$ ............................................. F16G 1/28
[52] U.S. Cl. ..................................... 474/153; 474/205
[58] Field of Search .................... 474/152, 153, 205

[56] References Cited

U.S. PATENT DOCUMENTS

| | | | |
|---|---|---|---|
| 4,337,056 | 6/1982 | Bruns | 474/153 |
| 4,403,979 | 9/1983 | Wujick | 474/153 |
| 4,452,594 | 6/1984 | Patterson | 474/153 |
| 4,553,952 | 11/1985 | Tangorra et al. | 474/153 |

Primary Examiner—Thuy M. Bui
Attorney, Agent, or Firm—Stevens, Davis, Miller & Mosher

[57] ABSTRACT

A toothed belt (1) having between its teeth (7) and the grooves (8) adjacent to the said teeth curvilinear connection segments (17) whose ends are located on the end of the tooth flank and the base line delimiting the grooves. The first end (18) of the curvilinear connection segment coincides with the first terminal point of an arc (20) tangent to the end of the flank and to the base line delimiting the grooves, the second end (19) of the curvilinear segment being located between the second point (21) of the said arc and the point of intersection (22) of the central axis of the groove L-L and the base line. Preferably, the toothed belt forms part of a transmission member including pulleys in which at least one of the pulleys is provided with teeth (24) filleted laterally with respect to the adjacent grooves (23) by curvilinear segments (31, 32) shaped to correspond to the curvilinear connection segments of the belt. Preferably, the curvilinear connection segments of the belt and of the pulley are parabolic arcs.

8 Claims, 4 Drawing Sheets

TOOTHED BELT AND MEANS OF TRANSMISSION RELATED THERETO

This is a divisional of application Ser. No. 433,789, filed Nov. 9, 1989.

DESCRIPTION OF THE INVENTION

The Present invention relates to a toothed belt and transmission means related thereto, and more particularly, to a toothed belt made of an elastomeric or similar material with new characteristics in the area forming the root between the flanks of a belt tooth and the grooves adjacent to each tooth.

It is of course known that a toothed belt consists of a body closed in the form of a loop and delimited by at least two faces one of which, for example the inner face, bears a plurality of projecting teeth alternating with a plurality of grooves.

In addition, the body of the belt incorporates longitudinally and in proximity to the teeth a plurality of traction-resistant members, for example glass fiber strands or textile material strands (or strands made of materials equivalent to these materials) for the purpose of conferring high inextensibility in the longitudinal direction of the belt.

The teeth are covered by at least one covering layer usually of a textile material made of, for example, and among others, polyamide.

In the stretched belt configuration, each tooth and each groove are symmetrical to their respective central axes directed at right angles to the longitudinal direction of the strands and hence of the faces.

More particularly, each tooth is formed of a head, two roots and two extended flanks beginning at the head.

Each groove is delimited by a base located on the same face of the belt as that from which the teeth project and all the bases of the grooves are located on a line hereinafter called the "base line".

Each tooth is also filleted with respect to the adjacent grooves by two segments in the form of arcs of a circle whose ends, the first and the second, are tangent to the lower end of the flank of a tooth and to the base line of the adjacent grooves respectively.

In known belts, there are unfortunately some circumstances that give rise to detachment of the covering fabric from the elastomeric material in the area where the flank of the tooth joins its adjacent groove. The main reason why the drawback thus described may occur has not yet been established with sufficient certainty. Nonetheless, it is believed that certain hypotheses may be advanced in an attempt to offer an explanation.

The drawback described could be provoked by the cell for continually higher levels of performance under operating conditions that are arduous for the belts currently employed, with the result that the tooth—and hence its covering—is mechanically stressed to a greater extent than that afforded by the geometrical dimensions of the belt itself.

In essence, the flank of the belt tooth which during the transmission of movement is subjected to the thrust of the pulley tooth is placed in a state of stress which means that the greater the power to be transmitted the more intense will be the stress acting on the fabric, especially in the zone between the flank and the adjacent groove where the root shapes like the arc of the circle joint in an extremely small space the base of the groove along the face of the belt with one flank at an appreciable angle to the said face, with the result that the tensile stress in the direction of the flank will tend at high values to detach the fabric from the elastomeric material it is covering.

In addition, it has been observed in many cases that at the start of the junction near the base of the groove the quantity of elastomer between the covering of the teeth and the longitudinal strands may not be enough to secure a good chemical attachment of the two parts, with the adverse result that there is an increased risk that the fabric may tend to detach itself from the strands in the event of very intense tangential forces.

Unfortunately no optimum solutions have as yet been found for the drawbacks mentioned, one reason being that current techniques and the research conducted on toothed belts are primarily directed to the choice of new tooth flank profiles or the determination of particular values for the ratio between the height and the base of a tooth and the tooth pressure angle, or to the use of appropriate elastomeric or covering materials, thus neglecting the investigation of other areas of a belt, including the area joining the flank and the groove of a tooth.

The principal object of this invention is thus to provide a toothed belt and transmission means related thereto capable of overcoming the said drawbacks in the area joining the flank of the tooth and its adjacent groove.

This and other objects of the invention that will become more clearly apparent from the further reading of this description are substantially attained by a flexible toothed belt comprising a body delimited by two faces, a plurality of teeth projecting from at least one of the said faces, a plurality of grooves alternating with the said teeth, traction-resistant members incorporated in the said body in the longitudinal direction of the belt and in proximity to the teeth, at least one layer of covering on the teeth, each groove being delimited when the belt is stretched by a base line located on the face from which the teeth project and symmetrical with respect to the central line, each tooth being symmetrical with respect to a central axis and formed of a head, two roots and two extended flanks starting from the head, each root comprising a curvilinear segment whose ends, the first and the second, are located at the end of the flank and on the base line of the groove respectively, each tooth having a tangent at the point of intersection between the root and the flank forming an angle of predetermined value "b" with the groove base line, the said belt being characterized in that the first end of the curvilinear root segment coincides with the first terminal point of an arc tangent to the flank and to the base line with the center of curvature lying on the bisectrix of the said predetermined angle while the said second end of the curvilinear segment is located between the second terminal of the said arc and the point of intersection of the central line of the groove and the base of the groove and at most is located on the said point of intersection on the base of the groove.

Another object of the invention is to provide a toothed pulley comprising a plurality of grooves alternating with a plurality of teeth, each groove being symmetrical with respect to the first radial central line and being formed of a base, two roots and two extended flanks starting from the base, each tooth being symmetrical with respect to a second radial central line and comprising a head delimited by the most radially external circumference of the pulley, the said head being united to the flanks by the said roots, each root comprising a curvilinear segment between two ends, the first and the second respectively, the said pulley being characterized in that each curvilinear root segment comprises the said first end coincident with the first terminal point of an arc tangent to the said external circumference of the pulley and to the flank with the center of curvature on the inside of the tooth on a circumference whose radius is smaller than that of the external circumference, the said second end of the curvilinear segment being located between the second terminal point of the said arc and the point of intersection of the said second central line radial with respect to the tooth and the external circumference and at most is located on the said point of intersection.

Figures 1, 1A, 2:
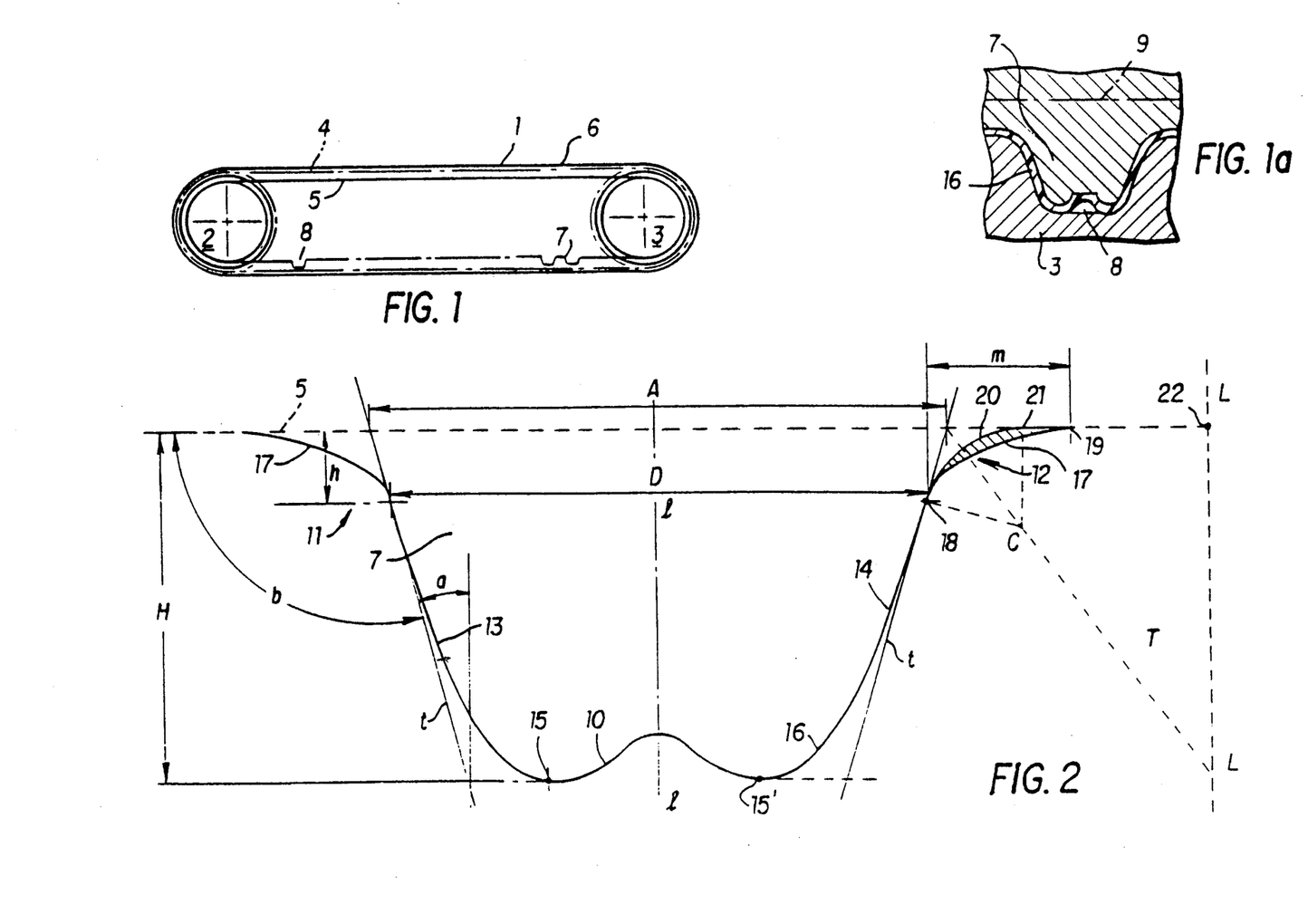

The present invention will be more readily understood from the following detailed description given by way of a non-limiting example with reference to the accompanying drawings, in which:

FIG. 1 is a longitudinal view of a transmission comprising a toothed belt, and an enlarged view (FIG. 1a) of a belt tooth in a pulley groove;

FIGS. 2, 3 and 4 represent in longitudinal section one embodiment of a belt tooth and its adjacent grooves according to the invention;

FIG. 1 illustrates a toothed belt (1) made of elastomeric or similar and generally viscoelastomeric material engaging with the two toothed pulleys (2 and 3) of a synchronous transmission means.

Belt (1) includes as usual an annular body (4) with two faces (5 and 6) and a plurality of teeth (7) projecting from the face (5).

The teeth (7) alternate with grooves (8) delimited at their base by a line hereinafter called the base line coincident with face (5). The base line identifies a rectilinear segment in each groove that may vary from one belt to another. Incorporated in the body of the belt is a plurality of traction-resistant members (9) set parallel to the longitudinal direction of the belt in proximity to face (5), as shown in the enlarged view of FIG. 1a.

Such longitudinally extended members may take the form of strands made of glass fibers or textile fibers or other resistant materials capable of conferring inextensibility on the belt so as to ensure its correct engagement with the toothed transmission pulleys (2) and (3).

Belt (1) in its rectilinear configuration between the two pulleys is identified by teeth and grooves symmetrical with respect to central axes (1—1) and L—L perpendicular to faces (5 and 6) and hence to the plane in which lie the traction-resistant members.

The head of each tooth (see FIG. 2) is identified by points (15,15') located at the maximum height H of face (5) and may have any kind of profile whatever, for example concave, as illustrated in FIG. 1, or flat or convex, or even be reduced to a point in the cases where the flanks of the tooth intersect along the axis (1—1).

Flanks (13 and 14) of the tooth (7) may take any form whatever, for example convex, as illustrated in FIG. 2, or even substantially rectilinear giving the tooth the shape of a trapezium with suitable connections near the head.

If given a convex profile, flanks (13 and 14) may be delimited by parabolic, circular, elliptical or hyperbolic arcs or by curves of a similar nature.

Irrespective of its shape, a belt tooth is further identified by the tangent t to the flank of the belt at the extreme lower point where the root begins.

Tangent t forms an acute angle a, known as the pressure angle, of predetermined value in the direction parallel to the central line (1—1) and hence an angle b equal to 90 degrees + a with the base line of the grooves coincident with the face (5).

A tooth also has a base A measured between the intersections of the tangents t to the base line. The grooves (8) of the teeth are given their bottom delimitation by the base line (5) and are in their turn joined to the flanks of the teeth with the roots (11, 12).

Furthermore, as may be seen in FIG. 2, the teeth are provided with a covering, for example a nylon fabric (16), or by other covering materials of the kind usually employed for transmission belts.

The fundamental characteristic of the invention is presented by the root zone between the flanks of the tooth and the grooves adjacent to each tooth.

In the present embodiment, each root is identified by a curvilinear segment (17) tangent to the flank at its lower extreme point (18) and intersecting the base line at point (19).

Moreover, another fundamental characteristic of the invention lies in the fact that the first (18) and second (19) ends of the curvilinear segment (17) are located as follows:

the first end (18) coincides with the first terminal point of an arc (20) of a circle (hatched in FIG. 2) drawn tangent to the flank at its lower end point having its center C on the bisectrix T of angle b;

The second end (19) is located between the second terminal point (21) of the said arc and the point of intersection (22) of the central axis L—L and the base line of the groove.

The broader feature provided by this embodiment of the invention thus rests on the fact that it comprises a curvilinear connection segment (17) that encloses, in relation to the tangent t and the base line, a greater quantity of elastomeric material than is enclosed by the hatched arc; in other words by the arc-shaped connection of conventional belts. The above-mentioned greater quantity of elastomeric material is represented in FIG. 2 by means of hatching designed to illustrate the difference in area compared with the prior art.

Preferably, the ratio between the base m and the maximum height h of the curvilinear segment (17) lies between 1.7 and 5, where:

the base of the curvilinear segment is measured between the portion of the first end on the base line and the second end;

the maximum height of the curvilinear segment is the distance of the first end from the base line.

Preferably, too, the curvilinear segment is tangent to the base line of the groove (8) at the position of the second end (19).

The curvilinear segment may be substantially tangent to the base line in position (19).

Here and in what follows the expression "substantially tangent" is used to indicate the fact that the curvilinear segment intersects the base line in such manner as to form an angle of 1 or 2 degrees.

Further particular embodiments falling within the scope of the present invention are all those in which the curvilinear connection segment (17) comprises ends (18, 19) respectively located on tangent t and on a base line such that the angle formed between them is from 95 degrees to 115 degrees. The embodiment just described is characterized by the fact that the ratio between the maximum height h of the curvilinear segment and the height H of the tooth lies between 0.15 and 0.5.

In addition, the ratio between the distance D of the first ends of the curvilinear segment and the base A of the tooth lies between 0.75 and 0.98.

Figure 3:
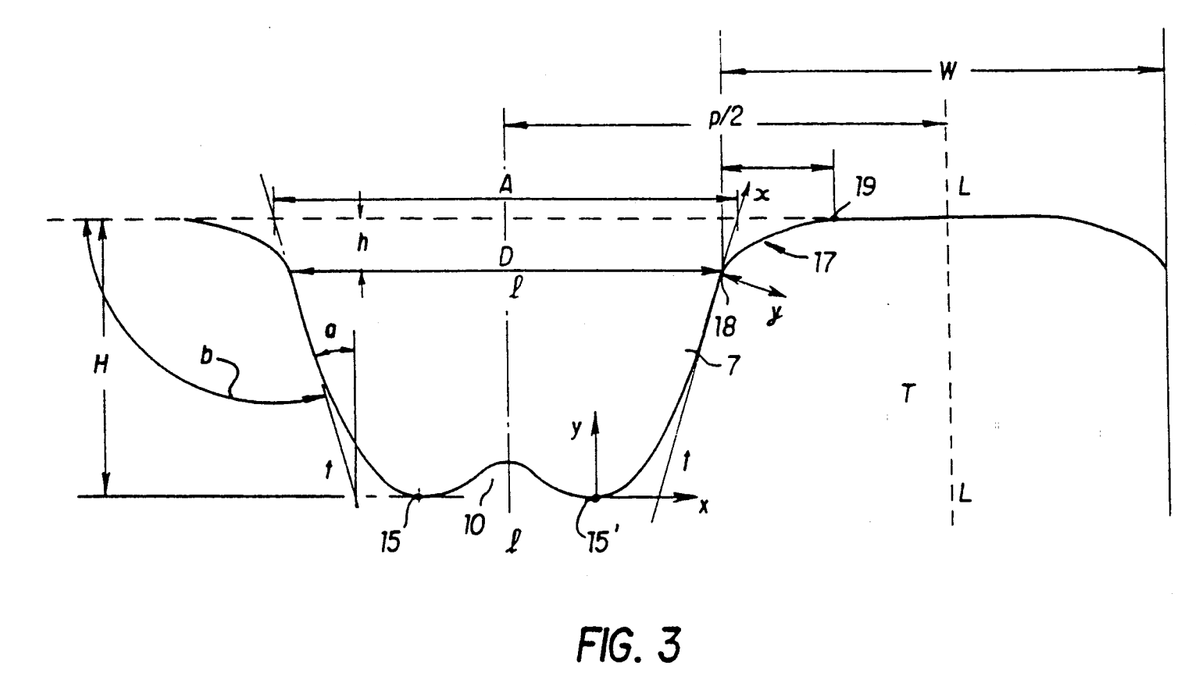

Another embodiment of the curvilinear shape of the connection segment (17) is illustrated in FIG. 3.

The curvilinear segment shown in FIG. 3 is a parabolic arc whose vertex is the point of origin of the Cartesian axes λ, y coincident with the point of intersection of the flank and the root of the tooth (7) having axis x coincident with the tangent to the belt flank at the point of origin of the root.

The parabolic arc is tangent to the tooth flank and to the groove base line respectively.

As already stated, the parabolic arc may be substantially tangent to the base line.

In particular, the parabolic arcs characteristic of one embodiment of the present invention are profiles drawn in accordance with the following equation:

$$y = ax^2$$

where parameter a lies between 0.15 and 20, and preferably between 0.5 and 8.

Parameter a is directly proportional to unity added to the sine of the pressure angle and is inversely proportional to four times the radius of the circle having its first end coincident with the vertex of the parabola multiplied by the sine of the pressure angle.

The whole tooth (7) may be formed by a parabolic arc in the root area, as already indicated, and a second parabolic arc for its flank.

The second parabolic arc for the flank is drawn in relation to axes x and y (FIG. 3) whose origin is the end point 15' of the head (10) of the tooth (7) and extending between the origin and end point (18).

In this embodiment, the equation delimiting the flank is as follows:

$$Y = ZX^2$$

where:

Z may vary between 0.1 and 20, and preferably between 0.35 and 10 for pitches ranging from 2 to 20 mm.

As an alternative to the parabolic root arc, segment (17) may be in the form of an elliptical arc with one end of its or semi-axis coincident with the origin of a system of axes coincident with the point of intersection of the flank and the root of the tooth.

In more general terms, the arc of segment (17) may be drawn from a profile with the following equation:

$$y = ax^n$$

where n in some instances may vary from 1.9 to 6 and a may vary from 0.1 to 20, and preferably from 0.9 to 1.1.

Figure 5:
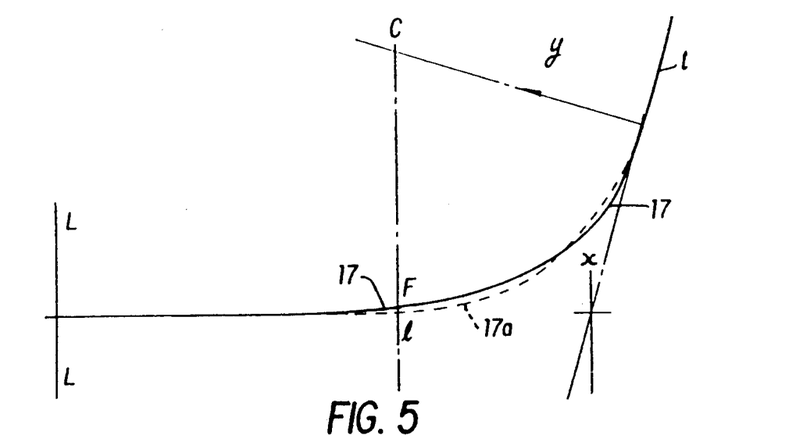
FIG. 5 is a variant of the connection between tooth and the groove in a belt according to the invention.

FIG. 5 schematically illustrates an enlargement of a curvilinear segment (17) in which the value for the said n is 3.68. A known circular arc with center C is also indicated as a dashed line (17a) in the same figure.

Examples of belts with arcs of connection according to the invention include those with the following ratios (FIG. 3):

W/D = 0.7–2.5, and preferably between 1 and 1.7;
W/P = 0.41–0.71, and preferably between 0.5 and 0.63;
H/A = 0.30–0.75 where with reference to the symbols in FIG. 3:

W represents the distance between the two first ends of the roots of two adjacent teeth measured parallel to the base line of the grooves;
A = the base of the tooth;
H = the height of the tooth
P = the pitch of the belt
D = the distance between the first ends of the two roots of the same tooth.

The dimension values of three belts with curvilinear segments (17) as illustrated in FIGS. 2 and 3 are set out by way of example in the following table:

| | Tooth dimension | | | Flank-groove connection | | | | Groove |
|---|---|---|---|---|---|---|---|---|
| | | | | Distance | | | Expression of parameter | |
| Pitch | Base A | Height H | Pressure angle a | between first ends D | Base m | Height h | a of curve $y = ax^2$ | Base with side connections W |
| 11 mm | 5.75 | 3.5 | 16° | 5.49 | 1.81 | 0.44 | 1.653 | 5.51 |
| 13 mm | 5.75 | 3.5 | 16° | 5.38 | 2.56 | 0.63 | 1.285 | 7.62 |
| 14 mm | 5.75 | 3.5 | 16° | 5.34 | 2.92 | 0.72 | 1.157 | 8.66 |

The flanks and head of the tooth in the preceding examples may be of any shape whatsoever, whether rectilinear or convex.

More particularly, the belt teeth may be delimited as set out below.

Distance between ends 15,15' of the tooth head = 2.15 mm

Equation corresponding to the tooth flank profile:

$$y = 1.095x^2$$

In the same way and by way of a supplement to the embodiment illustrated in FIG. 5, data are set out below for three toothed belts with a pitch 11, 13 and 14 mm having a flank-groove base root delimited by the equation:

$$y = ax^n$$

where n and a vary as shown in the corresponding columns.

| Pitch | Base A | Height H | Pressure angle a | D | h | m | W | Flank-groove conn. $y = ax^n$ | |
|---|---|---|---|---|---|---|---|---|---|
| | | | | | | | | a | n |
| 11 | 5.75 | 3.5 | 16° | 5.34 | 0.72 | 1.43 | 5.66 | 0.86 | 3.68 |
| 13 | 5.75 | 3.5 | 16° | 5.34 | 0.72 | 1.93 | 5.66 | 0.93 | 2.80 |

-continued

| Pitch | Base A | Height H | Pressure angle a | D | h | m | W | Flank-groove conn. $y = ax^n$ | |
|---|---|---|---|---|---|---|---|---|---|
| | | | | | | | | a | n |
| 14 | 5.75 | 3.5 | 16° | 5.34 | 0.72 | 2.18 | 8.66 | 0.98 | 2.54 |

The belt described thus far engages with toothed pulleys (2,3) of a synchronous motion transmission means (FIGS. 1 and 1a)

Generally speaking and as already known, each pulley comprises (FIG. 6) a groove (23) symmetrical with respect to a first central and radial line 1'—1' and teeth (24) symmetrical with respect to a second central radial line L'—L'.

Figure 6:
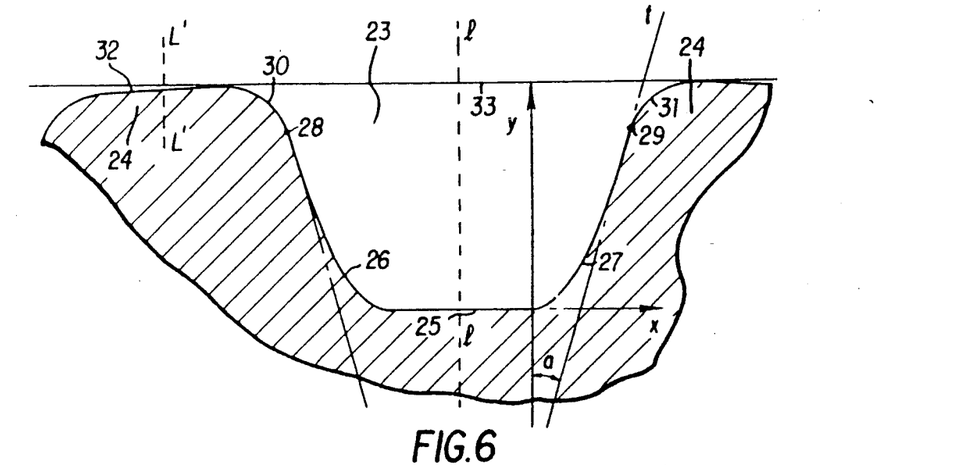
FIG. 6 shows a toothed belt in longitudinal section.

Groove (23) is formed of a base (25) and flanks (26,27) extending from the base as far as ends (28, 29) which are the starting points of the connection segments (30,31) leading to the teeth adjoining the groove.

The flanks of the groove, which may be curvilinear, for example, have at their ends tangents t', forming with axis 1'—1' a predetermined pressure angle substantially within the range of values for the belt pressure angle.

Teeth (24) comprise a head (32) identified by the outermost circumferential line (33) of the pulley.

Head (32) united to the flanks by the said connection segments which, in the known form, are circular arcs tangent to the flank and to the circumferential line (30); and the said circular arcs have their centers of curvature on an inner circumference whose radius is smaller than that of the outer circumference.

In one embodiment, the pulley may be made with flanks (27, 28) in the form of an arc parabolic with respect to axes x, y and having their vertices at the ends of the groove base (25).

The pulley flanks may also be made as described in U.S. Pat. No. 4,696,665 and incorporated herein by reference to provide still greater clarification of the parts referred to so far and of the dimensions relating to pulleys forming part of a transmission.

The pulley according to the present invention comprises a curvilinear connection segment between the flanks of the groove and the head of the adjacent tooth based on the principle already described herein in relation to the curvilinear connection between the flank of the belt tooth and its adjoining groove.

For this reason, the curvilinear connection (30 or 31) of the present pulley may be embodied in accordance with all the various forms hereinbefore described with reference to the belt.

For simplicity's sake, what has already been explained with regard to the base connection of the tooth will not be repeated in detail. Instead, a brief illustration of the fundamental characteristic of the pulley of the present invention is provided in FIG. 7.

Figure 7:
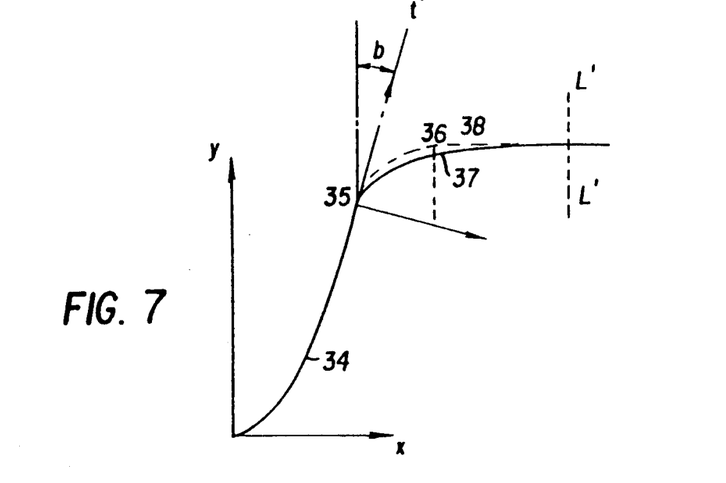
FIG. 7 shows the connection between a flank and an adjacent tooth in a pulley according to the invention.

As may be seen in FIG. 7, known pulleys comprise a flank (34), for example a parabolic arc drawn with respect to axes x, y and connected with a circular arc having its center O at the radially outermost portion of the tooth.

The circular connection arc with center O comprises terminal points (35) at the end of the flank (34) and in point (36) on the outer circumference of the pulley delimiting the head of the teeth.

The curvilinear connection segment (37) according to the invention comprises a first end coincident with the first terminal point (35) of the circular arc with center O and a second end (38) between the second terminal point (36) of the circular arc and the intersection between L'—L' and the head of the tooth.

In its maximum reachable position, the second end (38) may be coincident with the point of intersection of the second central line L'—L' and the tooth head.

By analogy with what has already been described with regard to the belt, the curvilinear connection segment may preferably be formed of a parabolic arc drawn with respect to axes at right angles to each other and having their origin at point (35) at the bottom end of the flank and with the X axis falling along tangent t'.

The pulley according to the present invention may also be given shapes different from that illustrated in FIG. 6. Among other possibilities, base (25) may be reduced to a point in the case where the groove of the pulley is defined by a profile in the form of a circular arc with a single center of curvature.

The dimensions of the pulley described, together with the shape of the grooves and the teeth, are chosen in relation to the dimensions and shape of the belt forming part of the transmission of this invention.

The present pulley may be combined with a belt whose tooth profile matches the profile of the pulley grooves or even with non-matching belts.

Furthermore, the present pulley may be combined with toothed belts having a base connection in the form of a circular arc between the tooth and the groove.

More particularly, the pulley according to this invention is preferably employed with the toothed belt hereinbefore described and this constituting at least one of the two transmission pulleys.

In addition the belt may have teeth whose height is equal to the depth of the pulley groove with which it engages or is more than or less than the said depth.

This invention achieves all of the pre-established goals.

Figure 4:
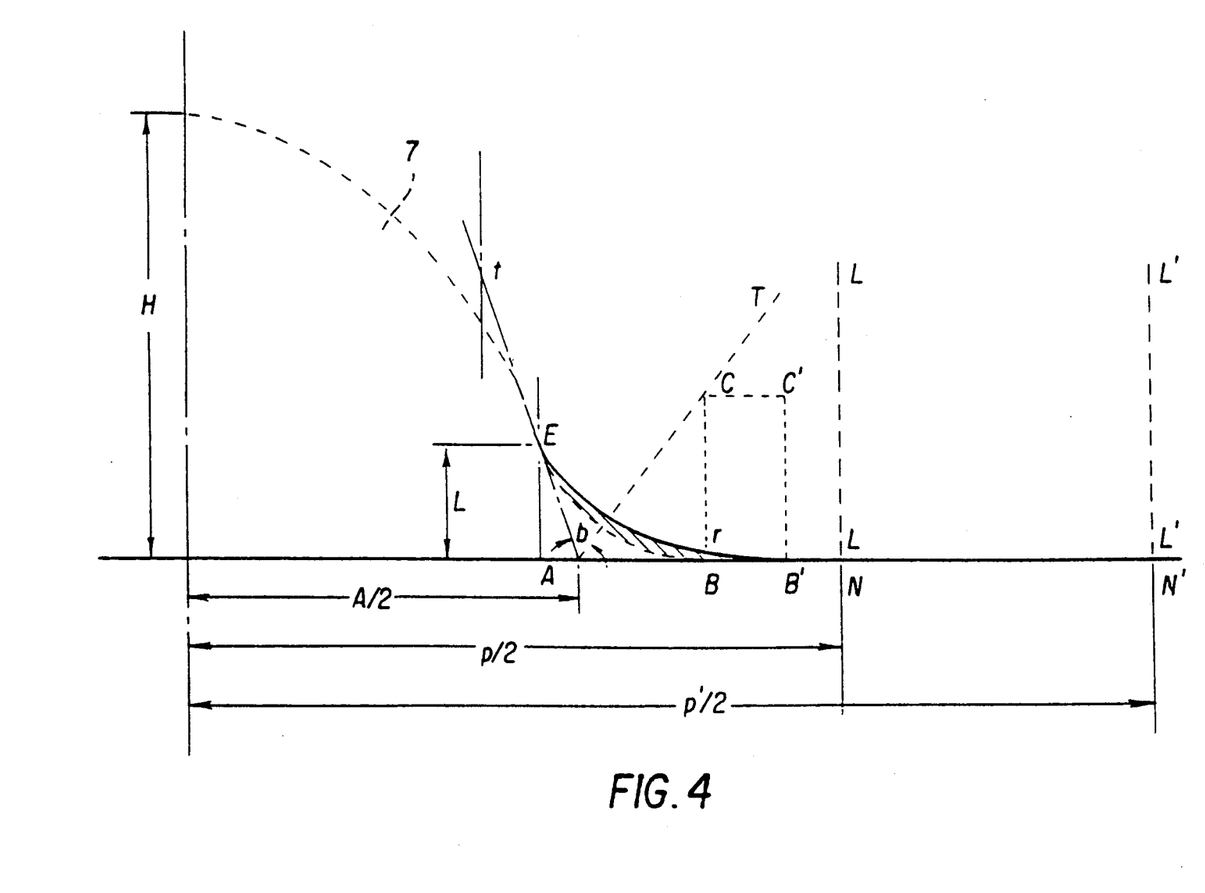

To provide a still clearer illustration of the attainment of the proposed goals, FIG. 4 shows the area of connection between the flank of the belt tooth and one half of the adjacent groove. The known connection is indicated by a dashed line, while that according to the invention is denoted by a continuous line.

As may be discerned from FIG. 4, the known connection is a circular arc between point E corresponding to the lower end of a tooth flank and the base line of the grooves.

Point E may at most be located as far as point D when the pressure angle a is zero. Point D is the point of intersection of the line C—C' and the line AE.

It may thus be said that the characteristic feature of the known connection is that is substantially contained within a square whose side BC is equal to the radius of the arc between the flank and the groove.

FIG. 4 makes it equally clear that the connection according to the present invention is a curvilinear segment contained in a rectangle whose longer side is identified by a length greater than the radius of the known to an extent dependent on the position of point B' in the space between B and N.

For the same height h of the first end E, therefore, the connection according to this invention permits an increase in the quantity of elastomeric material in the very area there detachment of the outer covering from the longitudinal strands (not shown in FIG. 4) was likely to occur.

In the proximity of point B, in fact, the longitudinal strands, which in known belts are attached by means of adhesive to covering fabric with small elastomer thicknesses, are here attached by adhesive to fabric with an appreciable increase in the thickness of the elastomeric material, as is also rendered evident by the segment BF.

In the proximity of point B, therefore, the attachment between the fabric and the strands in the presence of heavy traction stresses is made certain.

Moreover, shifting of the lower end of the connection from B to B' increases (in comparison to the prior art) the length of the fabric in contact with a substantial thickness of elastomeric material, resulting in a corresponding reduction in the per unit traction stress on the fabric, particularly at point B', together with the additional absence of detachment of the fabric from the stands when heavy loads act on the belt tooth.

Furthermore, with a shifting of the lower end of the connection from B to B' the idea of no longer fitting the connection curve within a square but in a rectangle has removed the constraint imposed by a curve in the form of a circular arc and has permitted the employment of other curves better able to ensure the gradual application of the traction stress on the fabric in the area between the flank and the groove.

In essence, whereas with known arrangements there was imposed in an extremely confined space corresponding to AB (of FIG. 4) an abrupt change in the belt profile from the flat segment of the groove to point E of the flank whose initial direction is at an appreciable angle with respect to the base of the groove, there is (in accordance with the present invention) in segment BB' an increase in the space within which the transition of the profile from the flat zone to the appreciably inclined zone takes place, and in addition, in the said space, the connection is delimited by any curve whatsoever with a more gradual slope than that of the curve of the prior art, for example, a parabolic arc tangent to the connection ends at E and B'.

The characteristics of the present connection also result in an increase in the strength of the tooth in relation to the loads transmitted by the corresponding pulley tooth.

Given the same tooth dimensions, in fact, the presence of connection E and B', as opposes to the known connection is responsible, as already stated, for an increase in the quantity of elastomeric material evidenced in the area E B' B identified in FIG. 4 by hatching.

The increased area of the zone near the base, therefore, augments the ability of the belt to transmit loads and to withstand overloads under heavy-duty conditions without on this account diminishing its service life compared to that of the prior art.

Attention is also drawn to the fact that the optimum results obtained stem from a solution based on a principle that actually runs counter to that underlying the prior art.

In known toothed belt technique, in fact, the space identified by the angle b between the tangent t to the flank and the base line of the grooves has hitherto been characterized by a connection in the form of a circular arc symmetrical with respect to the bisectrix T and angle b.

In short, it has always been felt for one reason or another that the said concept of symmetry should not be altered, very likely because of a conviction that little in the connection area could be modified for the purpose of achieving any improvement.

It has been perceived in accordance with the present invention that the connection area is one of the parts potentially at higher risk as far as the service life of a belt is concerned and effort has been concentrated on the search for solutions capable of minimizing the causes of such risk. The means of overcoming the drawbacks encountered in the past has been found in a principle opposed to that heretofore adopted in the prior art.

As may be discerned in FIG. 4, in fact, the present invention is based on the notion of the asymmetry of the connection curve with respect to the bisectrix T of angle b insofar as the curvilinear segment of the connection to the right of bisectrix T is larger than that on the left.

As a result, the present invention is not only new, but is also highly innovative since it overcomes the previously existing drawbacks through the application of a principle opposed to what has hitherto been evident in customary belt engineering.

In addition, and with reference to FIG. 5, it may be observed that the arrangement according to this invention is endowed with curvilinear segments (17) that maintain a greater quantity of elastomeric material in the most critical area compared with the circular arc, as rendered evident in practical terms by the distance BF.

In the upper area the curvilinear segment (17) may intersect the circular arc as shown in FIG. 5 and be deliberately brought closer than such arc to the tangent t to the flank.

This embodiment offers the advantage of reducing slippage between the belt tooth flank and the pulley tooth flank when the belt tooth is about to enter the pulley groove and is subjected to severe load conditions.

Further to that has already been said, attention is drawn to the fact that this invention includes a preferred embodiment based on a combination of the previously-mentioned characteristic relating to a curvilinear segment (17) as in FIGS. 2 and 3 and the characteristic relating to a groove base that is appreciably extended with respect to the base of the tooth.

This invention makes it possible to reach a further goal, namely that of increasing the resistance of the fabric to detachment from the underlying strands in the area of the base of the groove as a result of elevated traction stresses.

The result achieved with the above-mentioned preferred embodiment is unexpected.

An explanation of the attainment of the goal proposed may be realized by consideration in the first place of the simple schematization in FIG. 4, where for the same fundamental tooth dimensions, namely base A, height H, pressure angle a and curvilinear flanks profile, one may identify two belts, the first with a connection segment between the tooth flank and groove in the form of a circular arc and also with a groove base equal to 2 BN, the second with a curvilinear connection segment E B' and a groove base equal to 2 B'N'. In practice, the first belt has a pitch p and the second a longer pitch p', for example 9.525 mm and 14 mm respectively.

As may be readily understood, because the second belt has a longer pitch than the first it will have fewer teeth for the same belt length.

Assuming an identical load to be transmitted, therefore, it could have been expected that there would be a state of greater stress on each single tooth of the second belt, and hence a greater state of stress on the fabric mounted as a covering for the groove base with a corresponding possibility of a high risk of detachment of such fabric from the strands in the proximity of the base of the groove. In practice, however, a notable improvement has been obtained with the result of eliminating the said risk.

An explanation of the excellent result achieved may be gained from considerations relative to the analyses of toothed belt photoelasticity carried out to evidence the stresses imposed on teeth, as disclosed, for example in U.S. Pat. No. 3,756,091.

It is known, in fact, that in toothed belts the first tooth in mesh with the pulley teeth is stressed to an appreciably greater degree compared with the following meshed teeth.

It is thus possible to hold, on the strength of the photoelasticity findings, that change from a belt with pitch p to a belt with a longer pitch p', for example from 9.525 mm to 14 mm, makes virtually no difference to the deformation of the meshed teeth, with the result that extension of the groove base from BN to B'N' would in practice simply have the effect of augmenting the area of chemical adhesion between the fabric and the elastomer, thus avoiding phenomena of detachment from the underlying strands.

Moreover, in accordance with other possible embodiments and again with reference to FIG. 4, it would be possible to have a belt with segment B'N'=BN, for example, by passing from a belt with pitch 9.525 mm and a base connection with a circular arc to a belt with pitch 11 mm and a base connection that is curvilinear according to the present invention.

In this embodiment, too, albeit with fewer teeth, the belt would transport the same load, but there would be greater attachment between the strands and the fabric owing to the presence of segment EB', as already explained.

What is claimed is:

1. Toothed pulley comprising a plurality of grooves (23) alternating with a plurality of teeth (24), each groove being symmetrical with respect to a first radial central line (1'—1') and being formed of a base (25), two roots (30, 31) and two extended flanks (26, 27) starting from the base, each tooth being symmetrical with respect to a second radial central line and comprising a head (32) delimited by the most radially external circumference of the pulley, said head being united to the flanks by two roots, each root comprising a curvilinear segment between two ends, first and second respectively, said pulley being characterized in that each curvilinear root segment comprises said first end coincident with the first terminal point of a circular arc tangent to said external circumference of the pulley and to the flank with the center of curvature on the inside of the tooth on a circumference whose radius is smaller than that of the external circumference, said second end of the curvilinear segment being located between the second terminal point of said circular arc and the point of intersection of said second central line radial to the tooth and the external circumference and is at most located on said point of intersection.

2. Pulley as in claim 1 characterized in that said curvilinear root segment is a parabolic arc whose vertex is at the point of origin of axes at angles to each other coincident with the point of intersection between the groove flank and the root providing the connection to the continuous tooth.

3. A pulley as in claim 2, wherein said flank of the groove is delimited by a parabolic profile.

4. Pulley as in claim 1 characterized in that the flank (26, 27) of the groove is delimited by a parabolic profile.

5. Means for the transmission of motion between a toothed belt and at least two toothed pulleys characterized in that it comprises at least one of the toothed pulleys as claimed in claim 1.

6. A transmission apparatus for transmitting motion between a flexible toothed belt engaging with at least two pulleys as claimed in claim 1, said belt comprising a body delimited by two faces, a plurality of teeth projecting from at least one of said faces, a plurality of grooves alternating with said teeth, traction-resistant members incorporated in said body in the longitudinal direction of the belt and in proximity to the teeth, at least one layer of covering on the teeth, each groove being delimited when the belt is stretched by a base line located on the face from which the teeth project and symmetrical with respect to a central line (L—L), each tooth being symmetrical with respect to a central axis (1—1) and formed of a head, two roots and two extended flanks starting from the head, each root comprising a curvilinear segment whose ends, first and second, are located at the end of the flank and on the base line of the groove respectively, each tooth having a tangent (t) at the point of intersection between root and flank forming an angle of predetermined value (b) with the groove base line, said belt being characterized in that said first end of the curvilinear root segment coincides with a first terminal point of a circular arc tangent to the flank and to the base line with center of curvature (C) on the bisectrix (T) of said predetermined angle (b) and said second end of the curvilinear segment being located between a second terminal point of said arc and a point of intersection of the central line (L—L) of the groove and the base of the groove and at most is located on said point of intersection on the base of the groove.

7. A transmission apparatus for transmitting motion between a flexible toothed belt and at least two toothed pulleys, said belt comprising a body delimited by two faces, a plurality of teeth projecting from at least one of said faces, a plurality of grooves alternating with said teeth, traction-resistant members incorporated in said body in the longitudinal direction of the belt and in proximity to the teeth, at least one layer of covering on the teeth, each groove being delimited when the belt is stretched by a base line located on the face from which the teeth project and symmetrical with respect to a central line (L—L), each tooth being symmetrical with respect to a central axis (1—1) and formed of a head, two roots and two extended flanks starting from the head, each root comprising a curvilinear segment whose ends, first and second, are located at the end of the flank and on the base line of the groove respectively, each tooth having a tangent (t) at the point of intersection between root and flank forming an angle of predetermined value (b) with the groove base line, said belt being characterized in that said first end of the curvilinear root segment coincides with a first terminal point of a circular arc tangent to the flank and to the base line with center of curvature (C) on the bisectrix (T) of said predetermined angle (b) and said second end of the curvilinear segment being located between a second terminal point of said arc and a point of intersection of the central line (L—L) of the groove and the base of the groove and at most is located on said point of intersection on the base of the groove.

8. A transmission apparatus as in claim 7, wherein the ratio between the base and the maximum height of the curvilinear is between 1.7 and 5, where:

the base (m) of the curvilinear segment is measured between the projection of the first end on the base line and the second end; and the maximum height (h) of the curvilinear segment is the distance of the first end from the base line.

* * * * *